United States Patent [19]
Chen et al.

[11] Patent Number: 5,365,790
[45] Date of Patent: Nov. 22, 1994

[54] DEVICE WITH BONDED CONDUCTIVE AND INSULATING SUBSTRATES AND METHOD THEREFORE

[75] Inventors: Shiuh-Hui Chen, Lake Zurich; Carl Ross; Roseann M. Tomasello, both of Mundelein; Anita G. Brandes, Arlington Heights, all of Ill.

[73] Assignee: Motorola, Inc., Schaumburg, Ill.

[21] Appl. No.: 862,142

[22] Filed: Apr. 2, 1992

[51] Int. Cl.$^5$ ............................................. G01L 9/12
[52] U.S. Cl. ................................. 73/724; 29/25.41; 73/718; 361/283.4
[58] Field of Search ............... 73/718, 724; 361/283.1, 361/283.2, 283.3, 283.4; 29/25.41, 25.42

[56] References Cited

U.S. PATENT DOCUMENTS

| | | | |
|---|---|---|---|
| 3,634,727 | 1/1972 | Polye | 317/231 |
| 3,858,097 | 12/1974 | Polye | 317/248 |
| 4,025,942 | 5/1977 | Kurtz | 338/4 |
| 4,261,086 | 4/1981 | Giachino et al. | 29/25.41 |
| 4,384,899 | 5/1983 | Myers | 148/1.5 |
| 4,415,948 | 11/1983 | Grantham et al. | 361/283.1 |
| 4,432,007 | 2/1984 | Cady | 73/724 |
| 4,586,109 | 4/1986 | Peters et al. | 361/283.1 |
| 4,625,561 | 12/1986 | Mikkor | 73/724 |
| 4,701,424 | 10/1987 | Mikkor | 437/209 |
| 4,773,972 | 9/1988 | Mikkor | 204/16 |
| 4,831,492 | 5/1989 | Kuisma | 73/724 |
| 4,833,039 | 5/1989 | Mitoff et al. | 428/552 |
| 4,838,088 | 6/1989 | Murakami | 73/724 |
| 4,875,134 | 10/1989 | Kuisma | 361/282 |

OTHER PUBLICATIONS

"VLSI Technology", edited by S. M. Sze, published by McGraw-Hill Book Company in 1983, pp. 92–95, 150–151.

*Primary Examiner*—Donald Woodiel
*Attorney, Agent, or Firm*—Nicholas C. Hopman

[57] ABSTRACT

A device with bonded and conductive substrates is disclosed. This device includes a conductive substrate (509) having an electrically insulating layer (515) disposed on a portion thereon. An electrically conductive layer (519) is disposed on the electrically insulating layer (515). Then an insulating substrate (101) having a first surface (103) and an opposing second surface (105) with an electrically conductive coating (516) disposed on a portion thereon is provided. Finally, the insulating substrate (101) is bonded to the electrically conductive layer (519). In a more specific embodiment a capacitive pressure sensor is disclosed. This capacitive pressure sensor has a sealed chamber (125) and is further constructed with a conductive substrate (509) having an electrically insulating layer (515) disposed thereon. Further, an electrically conductive layer (519) is located on the electrically insulating layer (515) and an insulating substrate (101) having an electrically conductive coating (516) disposed thereon is bonded to the electrically conductive layer (519). Conductive feedthrough passageways (107, 109) are provided so that a measurement circuit may be electrically connected to the capacitive pressure sensor. Additionally a method for fabricating such devices is disclosed.

27 Claims, 5 Drawing Sheets

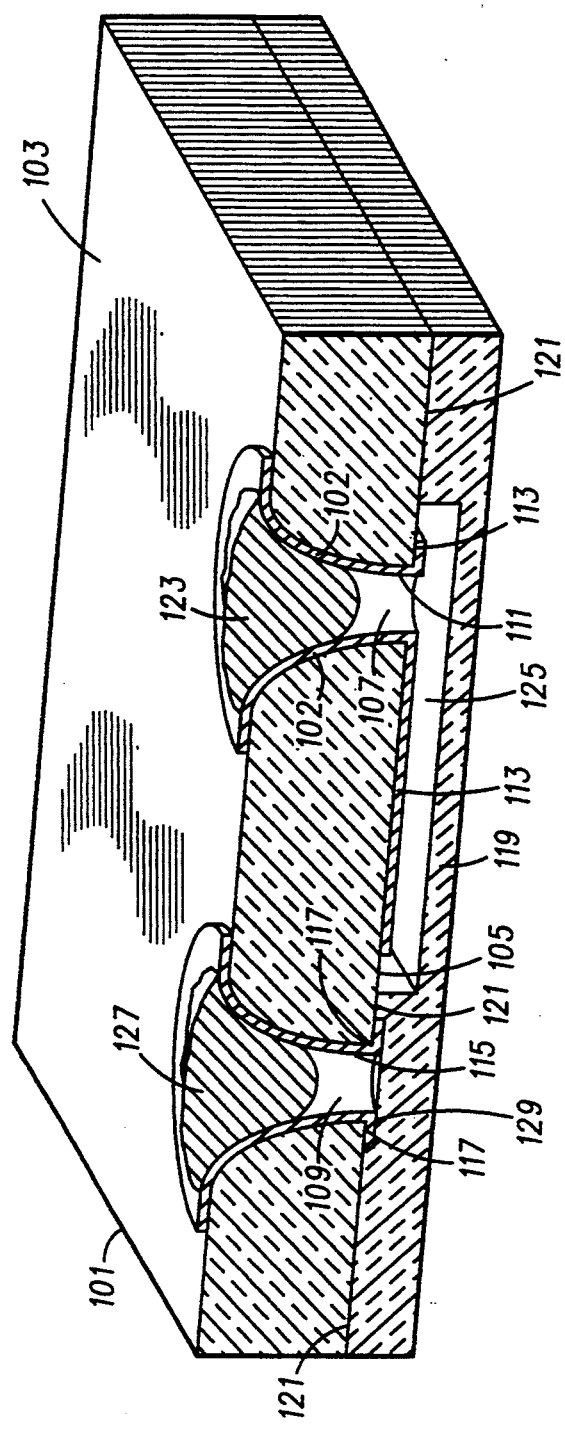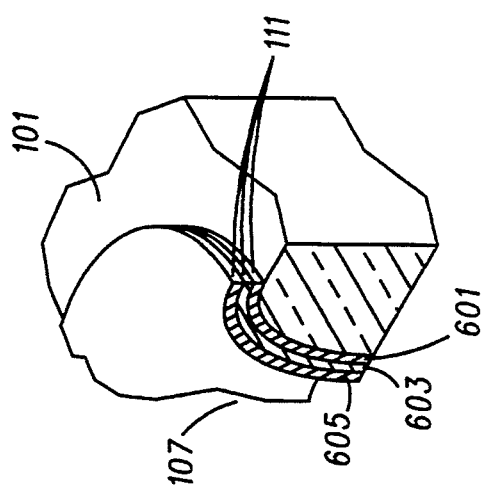

DEVICE WITH BONDED CONDUCTIVE AND INSULATING SUBSTRATES AND METHOD THEREFORE

FIELD OF THE INVENTION

This invention is generally directed to the field of devices having bonded conductive and insulating substrates and more particularly to an apparatus and method for providing an improved device having bonded conductive and insulating substrates. These devices may be usefully applied to construction of capacitive pressure sensors.

BACKGROUND OF THE INVENTION

Devices having bonded conductive and insulating substrates are fabricated with many different materials. Some of these devices require a sealed chamber with an external electrical contact to an internal electrically conductive element. Devices that typically have a requirement for this type of structure include capacitive pressure sensors. Considering the silicon variety of capacitive pressure sensors, one feature some have in common is a pressurized chamber for storing a reference pressure. This chamber is typically formed during the fabrication process and includes a passageway to the external surface of the chamber. This passageway is used to extend an electrical contact from the inside of the chamber, where an electrical element is located, to the outside of the chamber where it can be connected to an external measurement circuit. During manufacture the passageway to the chamber must be sealed after a reference pressure is provided in the chamber. This passageway must be both electrically conductive and sealed, to capture the aforementioned reference pressure. A combination of metal and glass materials are often used to create these sealed chambers and attendant passageways. These materials are fused into a structure by many different processes. These processes can include the disposing of a liquefied metal into a glass structure having a passageway therein, and then the solidification of the metal forming a fused interface sealing the chamber.

All of these metal and glass structures can suffer from a common problem. This problem is the failure of the fused interface, thereby leaking the stored reference pressure from the chamber. This happens when the metal and glass structures are subjected to a large temperature transition, or many large temperature transitions. These failures occur because of the difference in the thermal coefficient of expansion of metal and glass. For example, if the metal is solder, the solder will shrink to a much greater extent than the glass during a falling temperature transition. This results in a large strain at the fused interface, causing a crack in the glass, a crack directly between the solder and the glass, or a crack in the solder. In some cases many thermal transitions may be necessary before these failures occur.

In FIG. 1 a specific example is illustrated. This figure shows a cross section of a device having a sealed chamber with an external electrical contact to an internal electrically conductive element, in this case a prior art capacitive pressure sensor. This sensor uses a metal and glass structure to seal a first passageway 107 between a pressurized sealed chamber 125, in which a reference pressure is stored, and a first surface 103 of a glass substrate 101, where electrical interconnection to the capacitive element is provided. The glass substrate 101 with the first surface 103 has an opposing second surface 105. The first passageway 107, and a second passageway 109 are provided through the glass substrate 101. The first passageway 107 is then processed to include a metal layer 111 that extends to a first predetermined area 113 on the opposing second surface 105. The second passageway 109 is also processed to include a metal layer 115 that extends to a second predetermined area 117 on the opposing second surface 105 of the glass substrate 101.

A semiconductor substrate 119 is then attached to the opposing second surface 105 of the glass substrate 101 at locations shown by reference number 121 and to the second predetermined area 117. This attachment between the glass on the opposing second surface 105 and the semiconductor substrate 119, at locations shown by reference number 121, is performed by anodic, or electrostatic, bonding. This anodic bond seals the glass and semiconductor substrate at locations shown by reference number 121. The bond between the metal layer 115 that extends to the second predetermined area 117 and the semiconductor substrate 119, indicated by reference number 129, is the result of a chemical reaction that fuses the semiconductor substrate 119 and the metal layer 115 with heat and pressure.

The chamber 125 is pressurized and then a quantity of solder 123, 127 is melted into the first and second passageways 107, 109. The solder 123 in the first passageway, when cool, forms a interface for sealing the chamber 125 and provides an electrical contact to an element of a capacitor, formed by the metal layer 111 covering the first predetermined area 113. The solder 127 in the second passageway 109 provides an electrical connection to a second element of the capacitor formed by the semiconductor substrate 119. The solder 123, 127 formed in the first and second passageways 107, 109 is used to connect the capacitor to an external measurement circuit. When this capacitor is subjected to differing pressures, a portion of the semiconductor substrate 119 is displaced, in relationship to the metalized first predetermined area 113, causing a change in distance between the elements of the capacitor and thus capacitance.

The construction and sealing of the first passageway 107 is of particular concern. The temperature coefficient of solder and glass is substantially different. When the solder and glass structures are subjected to a temperature transition they expand or contract at different rates because of differing thermal coefficients of expansion. The differing rates cause stress to build up in the solder 123, particularly at the location denoted by reference number 102, and the glass substrate 101. This is undesirable because during large temperature transitions, at the location denoted by reference number 102, the glass substrate 101 and solder 123 will be over stressed and either or both will crack. This cracking causes the seal to be broken. When this seal is broken the reference pressure stored in chamber 125 is released and the sensor no longer can function as designed. Similar cracks in the glass-solder interface for the second passageway 109 have no effect on the chamber 125 because of the anodic bond at the locations shown by reference number 121. This anodic bond isolates the chamber 125 from any breaches in the second passageway 109.

What is needed is an improved device having a sealed chamber with an external electrical contact to an internal electrically conductive element.

SUMMARY OF THE INVENTION

A device with bonded and conductive substrates is disclosed. This device includes a conductive substrate having an electrically insulating layer disposed on a portion thereon. An electrically conductive layer is disposed on the electrically insulating layer. Then an insulating substrate having a first surface and an opposing second surface with an electrically conductive coating disposed on a portion thereon is provided. Finally, the insulating substrate is bonded to the electrically conductive layer.

In a more specific embodiment a device having a sealed chamber with an external electrical contact to an internal electrically conductive element is disclosed. This device includes a conductive substrate having a first top surface with an electrically insulating layer located on a portion of the first top surface. The electrically insulating layer has a second top surface spaced apart from the first top surface of the conductive substrate. An electrically conductive layer is located on the electrically insulating layer and has a third top surface spaced apart from the second top surface of the electrically insulating layer. The third top surface defines a boundary for a first electrically conductive contact area. An insulating substrate is provided with a first surface and an opposing second surface, the opposing second surface has an electrically conductive coating located thereon and provides an internal electrically conductive element. The electrically conductive coating is connected, via a conductive feedthrough passageway, through the insulating substrate to the first surface of the insulating substrate and provides an external electrical contact. A portion of the electrically conductive coating, located on the opposing second surface of the insulating substrate provides a second electrically conductive contact area. The insulating substrate is bonded to the electrically conductive layer, and the first electrically conductive contact area of the electrically conductive layer and the second electrically conductive contact area of the electrically conductive coating located on the insulating substrate are connected forming an electrical connection located apart from a sealed chamber, the sealed chamber located between the first top surface of the conductive substrate and the opposing second surface of the insulating substrate. Preferably, the internal electrically conductive element formed by the electrically conductive coating extends into the sealed chamber. Additionally a method for fabricating such devices is disclosed.

BRIEF DESCRIPTION OF THE DRAWINGS

FIG. 1 is a schematic diagram of a prior art sealed pressure sensor as described in the background.

FIG. 6 is a schematic diagram of a portion of a metalized glass passageway, useful in a sealed pressure sensor, constructed in accordance with the invention.

DETAILED DESCRIPTION OF A PREFERRED EMBODIMENT

Figure 2:
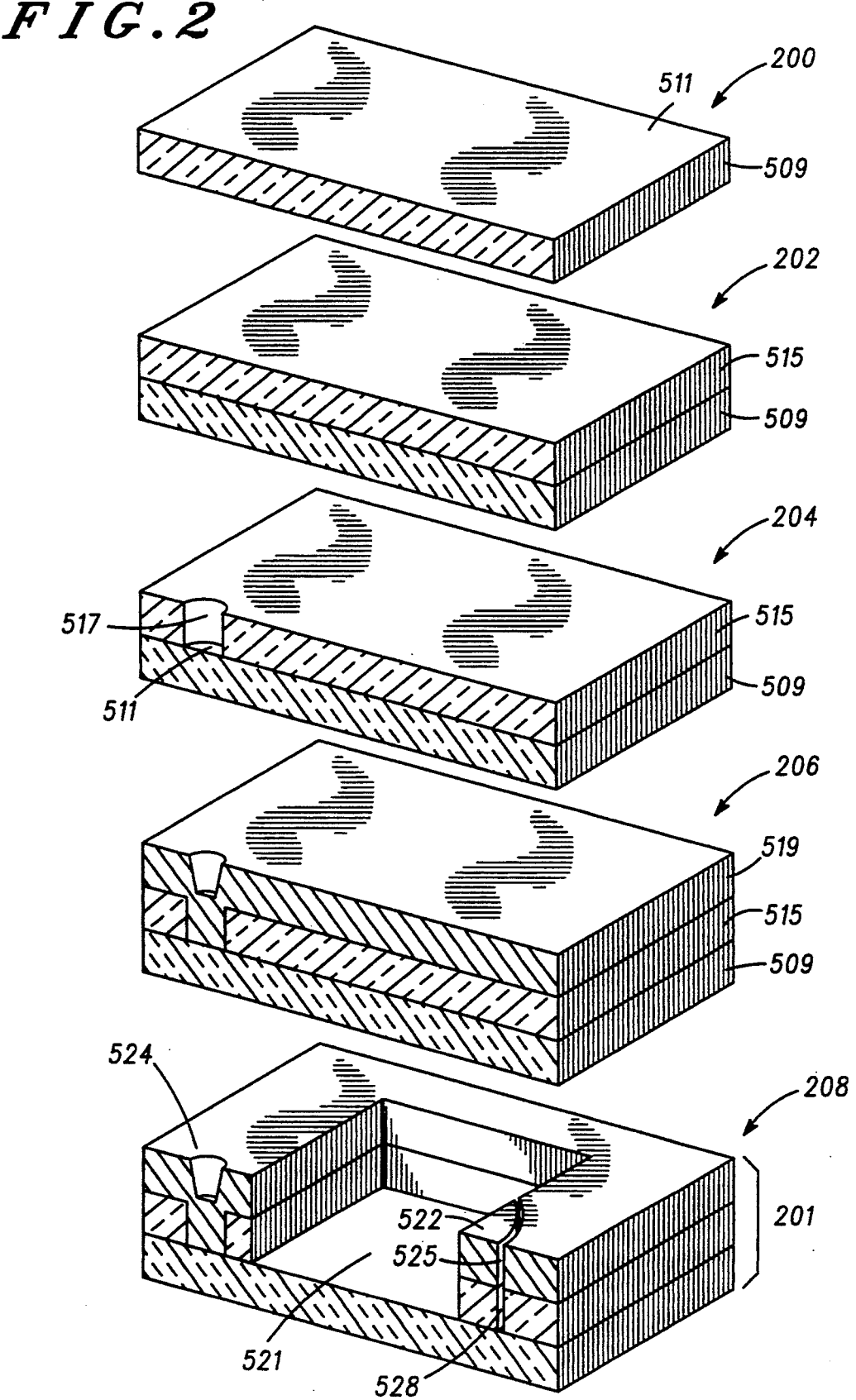
FIG. 2 is a schematic diagram illustrating various process steps for providing a first capacitive element substrate useful in a sealed pressure sensor constructed in accordance with the invention.
Figure 3:
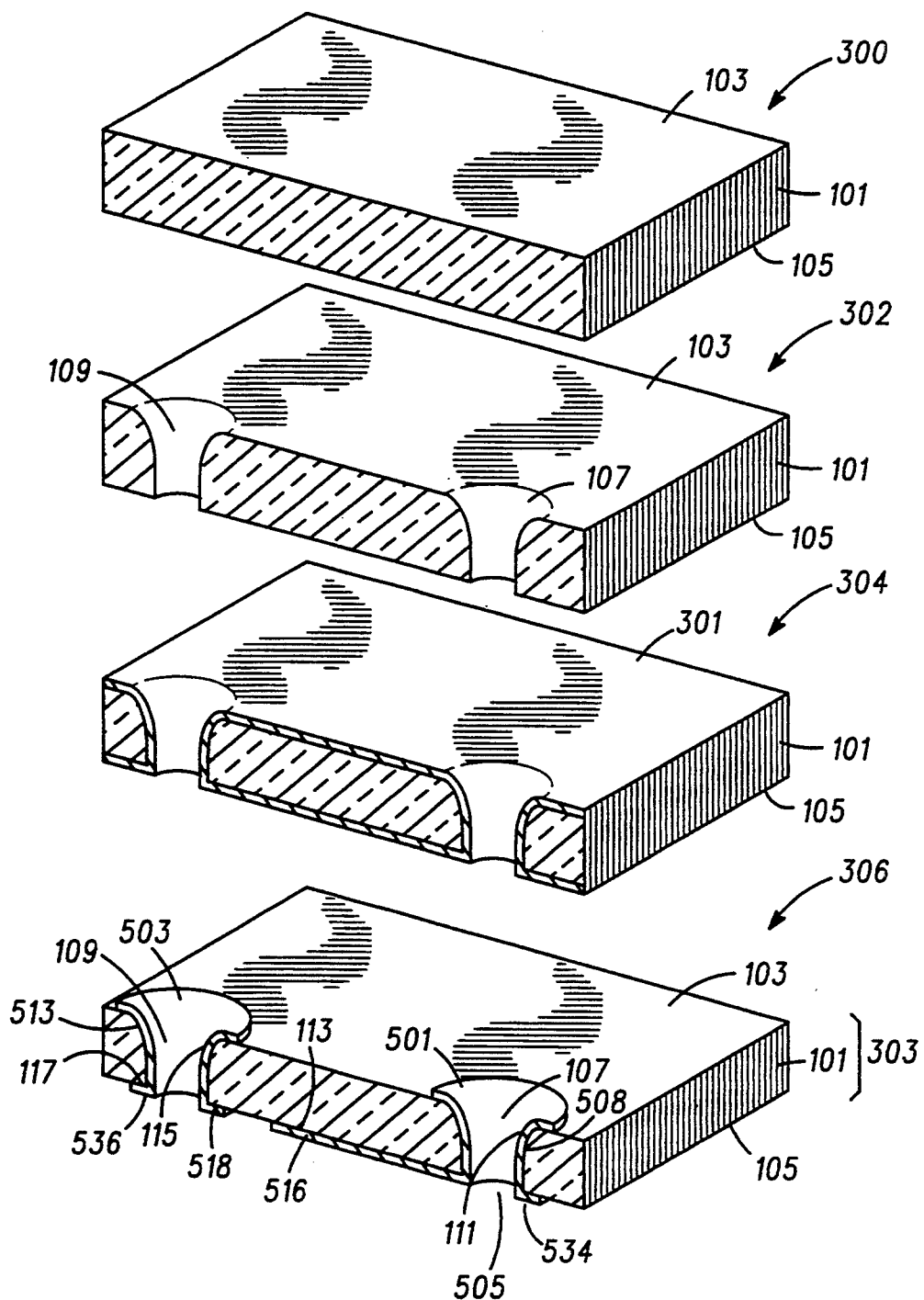
FIG. 3 is a schematic diagram illustrating various process steps for providing a second capacitive element substrate useful in a sealed pressure sensor constructed in accordance with the invention.
Figure 4:
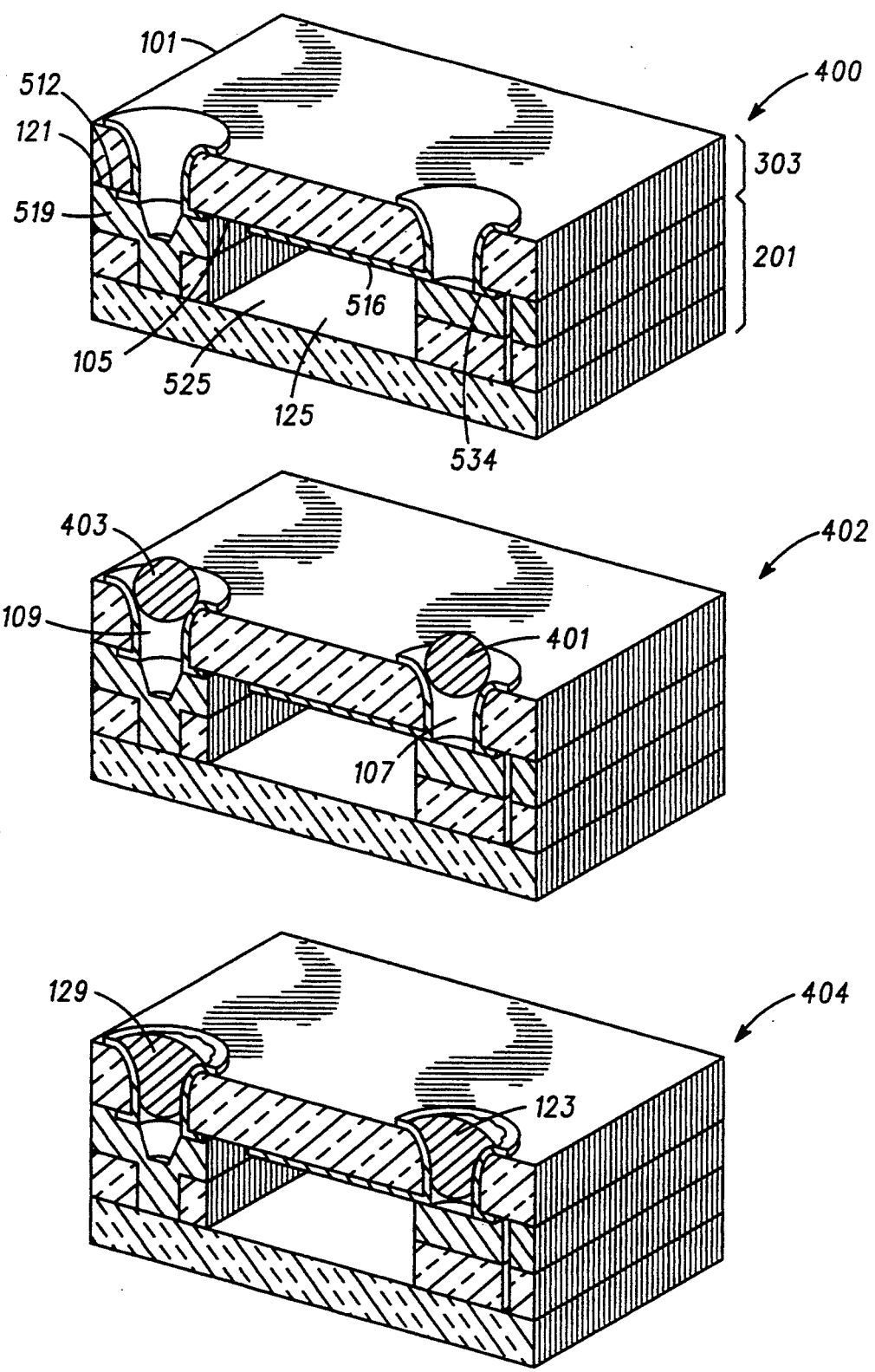
FIG. 4 is a schematic diagram illustrating various process steps for combining the first capacitive element substrate described in FIG. 2 and the second capacitive element substrate described in FIG. 3 to provide a sealed pressure sensor.

In FIGS. 2, 3, and 4 a method is illustrated to teach a fabrication process to make a capacitive pressure sensor with an improved interface between the pressurized chamber and the external electrical contacts. This embodiment overcomes the deficiencies of the prior art because the fragile glass and solder interface for the passageway 107 is no longer required to provide a seal. The apparatus resulting from the application of the present method is shown in FIG. 5 and will be described first.

Figure 5:
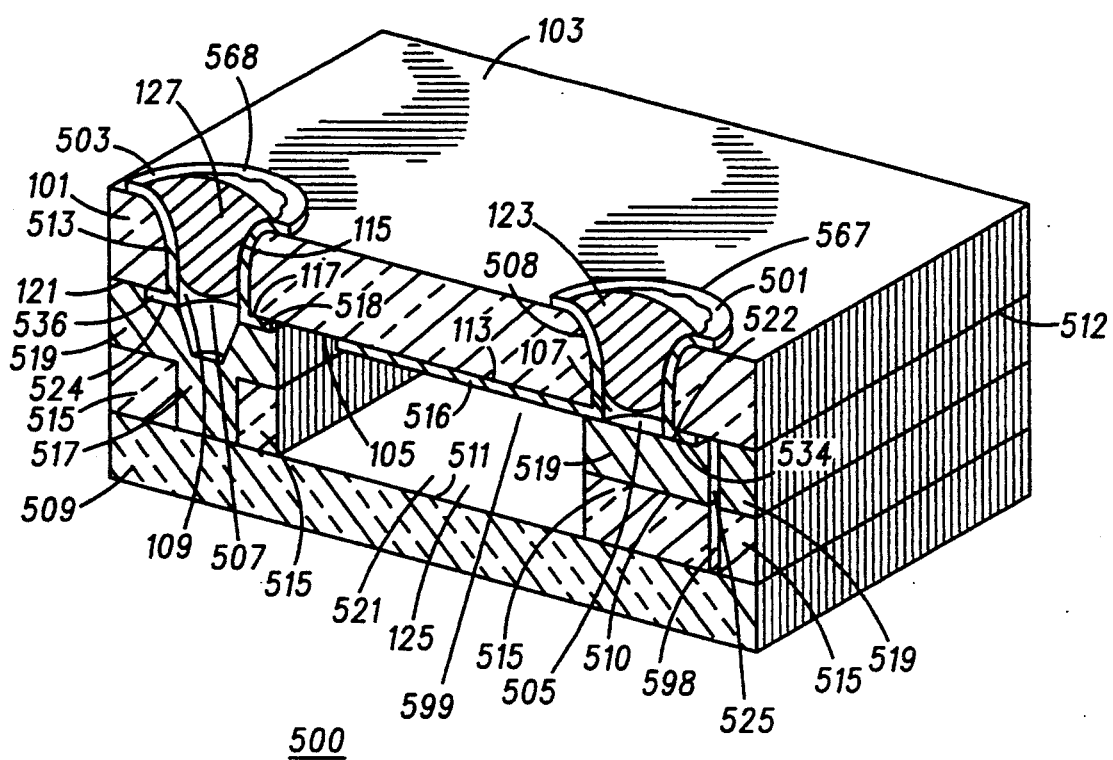
FIG. 5 is a schematic diagram of the improved sealed pressure sensor that results from the process steps shown in FIG. 4 in accordance with the invention.

FIG. 5 illustrates a capacitive pressure sensor 500 with a sealed pressure chamber 125. Note that reference numbers used in FIGS. 2, 3, 4, 5, and 6 that are identical to the reference numbers used in FIG. 1 are used to identify identical corresponding elements. However, note that the passageway 107 in FIGS. 3, 4, and 5 is located in a different position in substrate 103 than as shown in FIG. 1.

A silicon substrate 509 is provided with a first top surface 511. This silicon substrate 509 forms a first electrode of a capacitor. Other conductive substrates, including other semiconductor substrates, may be used for this function. An electrically insulating layer 515, in this case an oxide, or silicon dioxide, layer, is disposed on the first top surface 511 of the silicon substrate 509. The silicon dioxide layer 515 has a second top surface 510 spaced apart from the first top surface 511 of the silicon substrate 509. This silicon dioxide layer 515 has a lower chamber aperture 521, and a feedthrough aperture 517 located therein. Both the lower chamber aperture 521, and the feedthrough aperture 517 originate on the second top surface 510 of the silicon dioxide layer 515 and conclude on the first top surface 511 of the silicon substrate 509.

In the preferred embodiment a chemical vapor deposition process is used to dispose the silicon dioxide layer 515 and later to dispose a polysilicon layer 519. Various types of chemical vapor deposition, including high pressure deposition useful in fabricating a capacitive pressure sensor in accordance with the invention are reviewed in the textbook "VLSI TECHNOLOGY" edited by S. M. Sze and published by McGraw-Hill Book Company in 1983. See pages 92–95 and 150–151.

An electrically conductive, in this case polysilicon, layer 519 is disposed on the second top surface 510 of the silicon dioxide layer 515. The polysilicon layer 519 has a third top surface 512 spaced apart from the second top surface 510 of the silicon dioxide layer 515. The polysilicon layer 519 extends through the feedthrough aperture 517 of the silicon dioxide layer 515 and is disposed on and conductively contacts the silicon substrate 509.

A chamber aperture 599 is located between the third top surface 512, of the polysilicon layer 519 and the second top surface 510 of the silicon dioxide layer 515. Further, an isolation trench 525 is disposed in the polysilicon layer 519. The isolation trench 525 originates at the third top surface 512 of the polysilicon layer 519 and terminates at the second top surface 510 of the silicon dioxide layer 515. This isolation trench 525 defines a boundary for a first electrically conductive contact area 522 on the third top surface 512 of the polysilicon layer 519. This isolation trench 525 is used to electrically disconnect the firs[electrode of the capacitor, represented by the silicon substrate 509, from a second electrode of the capacitor described later.

Note that during the processing of the polysilicon layer 519 a lower isolation trench 598 extends the isolation trench 525 through the silicon dioxide layer 515. This is the result of choosing an efficient process and is not actually required because the isolation trench 525 in the polysilicon layer 519 isolates the first and second capacitive elements. However, the extension of the isolation trench 525 through the silicon dioxide layer 515 with the lower isolation trench 598 doesn't adversely effect the operation of the capacitive pressure sensor.

A portion of the polysilicon layer 519, disposed separated from the first electrically conductive contact area 522, provides a second electrically conductive contact area 524.

Further, an essentially planar glass substrate 101 is provided and has a first surface 103 and an opposing second surface 105. A first laser drilled passageway 107 originates at a first orifice 501 on the first surface 103 and continues to a third orifice 505 located on the opposing second surface 105. The purpose of the first laser drilled passageway 107 is to provide an electrical contact to the second electrode of the capacitor. The first passageway 107 has a first inner surface 508. A first metal layer 111, composed of successive layers of chromium, nickel vanadium, and gold, is disposed on the first inner surface 508 starting at the first orifice 501. This first metal layer 111 then extends through the first passageway 107 and continues along the first inner surface 508 to the third orifice 505 on the opposing second surface 105 of the glass substrate 101.

The metals can be attached using many known methods. In the preferred embodiment a sputtering process is used. Various types of sputter deposition are reviewed in the textbook "VLSI TECHNOLOGY" edited by S. M. Sze and published by McGraw-Hill Book Company in 1983. See pages 358–361.

A second metal layer 516, electrically connected to the first metal layer 111, is composed of successive layers of chromium and gold. It starts at the third orifice 505 and continues on the opposing second surface 105 to a first predetermined area 113. The second metal layer 516 located at this first predetermined area 113 serves as the second electrode of the capacitor, and also provides a third electrically conductive contact area 534, adjacent to the third orifice 505. The use of the third electrically conductive contact area 34 will be described below.

A second laser drilled passageway 109 originates at a second orifice 503, on the first surface 103 and continues to-a fourth orifice 507 on the opposing second surface 105. The purpose of the second laser drilled passageway 109 is to provide an electrical contact to the first electrode of the capacitor. The second passageway 109 has a second inner surface 513. A third metal layer 115, composed of successive layers of chromium, nickel vanadium, and gold, is disposed on the second inner surface 513 starting at the second orifice 503. This third metal layer 115 then extends through the second passageway 109, along the second inner surface 513, and continues to the fourth orifice 507. A fourth metal layer 518, electrically connected to the third metal layer 115, is composed of successive layers of chromium and gold. It starts at the fourth orifice 507 and continues on the opposing second surface 105 to a predetermined area 117. This predetermined area 117 provides a fourth electrically conductive contact area 536 that will be described below.

The opposing second surface 105 of the glass substrate 101 is bonded, in this case anodically or electrostatically, as shown at reference number 121, to the polysilicon layer 519. This bonds the glass substrate 101 to the polysilicon layer 519 and forms a sealed chamber 125, including the chamber aperture 599 of the polysilicon layer 519, the lower chamber aperture 521 of the silicon dioxide layer 515, the isolation trench 525 and the lower isolation trench 598, all located between the opposing second surface 105 of said glass substrate 101 and the first top surface 511 of the silicon substrate 509, in which a reference pressure is stored. During this anodic bonding process the second metal layer 516, located at the third electrically conductive contact area 534, and the first electrically conductive contact area 522 of the polysilicon layer 519 are fused. This anodic bond as shown at reference number 121 and the fusing of the second metal layer 516, located at the third electrically conductive contact area 534, and the first electrically conductive contact area 522 of the polysilicon layer 519 provide a barrier between the first surface 103 of the glass substrate 101 and the chamber 125. This is because the passageway 107 and the orifice 505 are spaced away from the chamber 125, unlike the passageway 107 in the sensor shown in FIG. 1. Further, the fourth metal layer 518, located at the fourth electrically conductive contact area 536, and the second electrically conductive contact area 524 of the polysilicon layer 519 are fused. This provides an electrical connection between the first surface 103 of the glass substrate 101 and the polysilicon layer 519 and the first electrode of the capacitor represented by the silicon substrate 509.

Since the anodic bond as shown at reference number 121, the fusing of the second metal layer 516 located at the third electrically conductive contact area 534 and the first electrically conductive contact area 522 of the polysilicon layer 519 provide a seal for the chamber 125 and there is no need to rely on the solder to provide a seal in the first passageway 107 as the prior art did. If cracks in solder 123 in the passageway 107 in the glass substrate 101 occur they are inconsequential to the sealing of the chamber 125.

A first external electrical contact 568 to the first electrode of the capacitor, represented by the silicon substrate 509, is provided at the first surface 103 of the glass substrate 101. To aid connection a portion of solder 127 is melted into the second passageway 109 at the second orifice 503. A second external electrical contact 567 to the second electrode of the capacitor, represented by the first metal coating 516, is provided at the first surface 103 of the glass substrate 101, spaced apart from the first external electrical contact 568. To aid connection a portion of solder 123 is melted into the first passageway 107 at the first orifice 501. The apparatus in FIG. 5 embodies the inventive design. Next the fabrication method is discussed.

FIGS. 2, 3, and 4 provide the illustrations for the fabrication method tutorial. Starting in FIG. 2, a first step 200 is to provide a silicon substrate 509. This silicon substrate 509 has a first top surface 511. Then in step 202 a silicon dioxide layer 515 is disposed on the first top surface 511 of the silicon substrate 509. As mentioned earlier, a chemical vapor deposition process is used in this embodiment. This silicon dioxide layer 515 is then patterned and the result is shown in step 204. The patterning opens a feedthrough aperture 517 through the silicon dioxide layer 515, to the first top surface 511 of the silicon substrate 509. The patterning process used in this embodiment is a photolithographic process of applying photoresist, exposing and developing the photoresist, etching the surface on which the photoresist was applied, and then removing the photoresist. This process is commonly known to those of ordinary skill in the art.

The next step 206, is to dispose a conductive polysilicon layer 519 on the silicon dioxide layer 515. Note that because a feedthrough aperture 517 was patterned in step 204 the polysilicon layer 519 disposes through the feedthrough aperture 517 and conductively contacts the silicon substrate 509.

Then the composite substrate 201 is patterned to open the chamber aperture 599, the lower chamber aperture 521, an isolation trench 525, and a lower isolation trench 598 through the polysilicon layer 519 and the silicon dioxide layer 515 to the silicon substrate 509. The result is shown in step 208.

Referring to FIG. 3, a next step 300, is to provide a glass substrate 101 having an first surface 103 and an opposing second surface 105.

The next step 302, is to provide a first passageway 107 and a second passageway 109, disposed between the first surface 103 and the opposing second surface 105 of the glass substrate 101. This is done by laser drilling through the glass substrate 101. Of course, other processes may be used.

The next step 304, is to dispose a metal layer 301 on the first surface 103, the opposing second surface 105 and in the first and second passageways 107, 109 of the glass substrate 101. For the capacitive pressure sensor being constructed, successive layers of chromium, nickel vanadium and gold are used on the first surface 103 and the first and second passageways 107, 109 and successive layers of chromium and gold are used on the opposing second surface 105. Of course, other metals can be used.

Then the glass substrate 101 is patterned to remove the excess metal layer on the first surface 103 and the opposing second surface 105. This step 306 provides a first metal layer 111 starting at the first orifice 501 and continuing along the first inner surface 508 of the first passageway 107 and extending to the third orifice 505 on the opposing second surface 105. This step 306 also provides a second metal layer 516, connected to the first metal layer 111 at the third orifice 505 and continuing on the opposing second surface 105 to a first predetermined area 113, forming a second electrode of the capacitor and providing a third electrically conductive contact area 534, adjacent to the third orifice 505. This step 306 also provides a third metal layer 115 starting at the second orifice 503 and continuing along the second inner surface 513 of the second passageway 109 and extending to the fourth orifice 507 on the opposing second surface 105. This step 306 also provides a fourth metal layer 518, connected to the second metal layer 115 at the fourth orifice 507 and continuing on the opposing second surface 105 to a second predetermined area 117, and providing a fourth electrically conductive contact area 536. This results in a second capacitive element substrate 303 shown in FIG. 3.

Referring to FIG. 4, a next step 400, is to anodically bond the first capacitive element substrate 201 to the second capacitive element substrate 303. A predetermined reference pressure, in this case a vacuum, is applied outside the first capacitive element substrate 201 and the second capacitive element substrate 303. This is done by placing both substrates 201 and 303 in a bell jar and evacuating it. Then the anodic bond is made, as shown by reference number 121 in FIG. 4 step 400. As mentioned earlier, during the anodic bonding process the second metal layer 516, located at the third electrically conductive contact area 534, and the first electrically conductive contact area 522 of the polysilicon layer 519 are fused. This anodic bond as shown at reference number 121 and the fusing of the second metal layer 516, located at the third electrically conductive contact area 534, and the first electrically conductive contact area 522 of the polysilicon layer 519 provide a barrier between the first surface 103 of the glass substrate 101 and the chamber 125, thereby storing the predetermined reference pressure.

In a next step 402, a portion of solder in the form of solder balls 401 and 403 are disposed in the first passageway 107 and the second passageway 109.

Finally, in step 404, the anodically bonded and fused first capacitive element substrate 201 and second capacitive element substrate 303 is heated, melting the solder balls 401, 403 disposed in the first and second passageways 107, 109. Then the assembly is cooled forming the final capacitive pressure sensor apparatus shown in FIG. 5.

Of course, persons of ordinary skill in the art will realize that the precise sequence of each step of this process may not be critical and other sequences could also be used to form this structure.

In FIG. 6 the first metal layer 111 of the first passageway 107 is detailed as being composed of several metal layers as revealed earlier. The substrate 101 is preferably coated with successive layers of chromium 601, nickel vanadium 603, and gold 605. These materials are useful in constructing a capacitive pressure sensor.

The geometries of the constituent elements, including the silicon substrate 511, the silicon dioxide layer 515, the polysilicon layer 519, the glass substrate 101 and the various patterns 521, 522, 598, 599, 525, 534, and 536 illustrated herein, are suitable for a capacitive pressure sensor. Of course, other geometries may also be used to take advantage of the inventive process described.

Although this embodiment details sealing a capacitive pressure sensor, this invention can be applied to other sealing problems where an insulated electrical contact is required.

What is claimed is:

1. A device having a sealed chamber with an external electrical contact to an internal electrically conductive element comprising:
   a conductive substrate having a first top surface;
   an electrically insulating layer disposed on a portion of the first top surface of said conductive substrate and having a second top surface spaced apart from the first top surface of said conductive substrate;
   an electrically conductive layer disposed on said electrically insulating layer and having a third top surface spaced apart from the second top surface of said electrically insulating layer, the third top surface defining a boundary for a first electrically conductive contact area; and an insulating substrate having a first surface and an opposing second surface, the opposing second surface having an electrically conductive coating disposed thereon for providing an internal electrically conductive element, the electrically conductive coating connected via a conductive feedthrough passageway through said insulating substrate to the first surface of said insulating substrate and providing an external electrical contact, wherein a portion of said electrically conductive coating, located on the opposing second surface of said insulating substrate providing a second electrically conductive contact area, and wherein said insulating substrate is bonded to said electrically conductive layer, and wherein the first electrically conductive contact area of said electrically conductive layer and the second electrically conductive contact area of the electrically conductive coating disposed on said insulating substrate are connected forming an electrical connection located apart from a sealed chamber, the sealed chamber located between the first top surface of said conductive substrate and the opposing second surface of said insulating substrate.

2. A device in accordance with claim 1 wherein said electrically insulating layer comprises a silicon oxide material.

3. A device in accordance with claim 1 wherein said electrically conductive layer comprises a polysilicon material.

4. A device in accordance with claim 1 wherein said insulating substrate bonded to said electrically conductive layer comprises an insulating substrate anodically bonded to said electrically conductive layer.

5. A device in accordance with claim 1 wherein said insulating substrate comprises a glass substrate.

6. A device in accordance with claim 1 wherein the electrically conductive coating disposed on said insulating substrate is electrically isolated from said conductive substrate.

7. A device having a sealed chamber with an external electrical contact to an internal electrically conductive element comprising:

a conductive substrate having a first top surface, an electrically insulating layer disposed on a portion of the first top surface of said conductive substrate and having a second top surface spaced apart from the first top surface of said conductive substrate, said electrically insulating layer having a feedthrough aperture disposed therein and originating at the second top surface of said electrically insulating layer and concluding at the first top surface of said conductive substrate;

an electrically conductive layer disposed on a portion of said electrically insulating layer and having a third top surface spaced apart from the second top surface of said electrically insulating layer, said electrically conductive layer extending through the feedthrough aperture of said electrically insulating layer and conductively contacting said conductive substrate, said electrically conductive layer having a chamber aperture disposed therein and originating at the third top surface of said electrically conductive layer and terminating at the second top surface of said electrically insulating layer, said electrically conductive layer having an isolation trench disposed therein and originating at the third top surface of said electrically conductive layer and terminating at the second top surface of said electrically insulating layer and defining a boundary for a first electrically conductive contact area on the third top surface of said electrically conductive layer; and an insulating substrate having a first surface and an opposing second surface, the opposing second surface having an electrically conductive coating disposed on a portion thereon for providing an internal electrically conductive element, the electrically conductive coating connected via a conductive feedthrough passageway through said insulating substrate to the first surface of said insulating substrate and providing an external electrical contact, wherein a portion of said electrically conductive coating located on the opposing second surface providing a third electrically conductive contact area, and wherein said insulating substrate is bonded to said electrically conductive layer and providing a sealed chamber, the sealed chamber including the chamber aperture and the isolation trench, both located between the opposing second surface of said insulating substrate and second top surface of said electrically insulating layer, and wherein the first electrically conductive contact area of said electrically conductive layer and the third electrically conductive contact area of the electrically conductive coating disposed on the opposing second surface of said insulating substrate, are connected forming an electrical connection at a location separate from the sealed chamber.

8. A device in accordance with claim 7 further comprising:

a second electrically conductive contact area located on the third top surface of said electrically conductive layer and electrically isolated from the first electrically conductive contact area;

a fourth electrically conductive contact area located on the opposing second surface of said insulating substrate electrically isolated from the third electrically conductive contact area of the electrically conductive coating;

a second conductive feedthrough passageway disposed through said insulating substrate and contacting the fourth electrically conductive contact area on the opposing second surface of said insulating substrate and providing an additional external electrical contact located on the first surface of said insulating substrate, and wherein the second electrically conductive contact area of said electrically conductive layer and the fourth electrically conductive contact area located on the opposing second surface of said insulating substrate, are connected forming an additional electrical connection at a location separate from the electrical connection.

9. A device in accordance with claim 8 wherein second conductive feedthrough passageway is spaced apart from said sealed chamber.

10. A device in accordance with claim 8 further comprising a portion of solder disposed in said first and second conductive feedthrough passageways.

11. A device in accordance with claim 8 wherein said first conductive feedthrough passageway and said second conductive feedthrough passageway comprise a first metal coated passageway and a second metal coated passageway.

12. A device in accordance with claim 7 wherein said electrically insulating layer comprises a silicon oxide material.

13. A device in accordance with claim 7 wherein said electrically conductive layer comprises a polysilicon material.

14. A device in accordance with claim 12 wherein said electrically conductive layer comprises a polysilicon material.

15. A device in accordance with claim 7 wherein said insulating substrate bonded to said electrically conductive layer comprises an insulating substrate anodically bonded to said electrically conductive layer.

16. A capacitive pressure sensor comprising:
   a conductive semiconductor substrate having a first top surface, wherein said conductive semiconductor substrate is used as a first electrode of a capacitor;
   an electrically insulating oxide layer disposed on a portion of the first top surface of said conductive semiconductor substrate and having a second top surface spaced apart from the first top surface of said conductive semiconductor substrate, said electrically insulating oxide layer having a feedthrough aperture disposed therein and originating at the second top surface of said electrically insulating oxide layer and concluding at the first top surface of said conductive semiconductor substrate;
   a electrically conductive polysilicon layer disposed on a portion of said electrically insulating oxide layer and having a third top surface spaced apart from the second top surface of said electrically insulating oxide layer, said electrically conductive polysilicon layer extending through the feedthrough aperture of said electrically insulating oxide layer and conductively contacting said conductive semiconductor substrate, said electrically conductive polysilicon layer having a chamber aperture disposed therein and originating at the third top surface of said electrically conductive polysilicon layer and terminating at the second top surface of said electrically insulating oxide layer, said electrically conductive polysilicon layer having an isolation trench disposed therein and originating at the third top surface of said electrically conductive polysilicon layer and terminating at the second top surface of said electrically insulating oxide layer and defining a boundary for a first electrically conductive contact area on the third top surface of said electrically conductive polysilicon layer, a portion of said electrically conductive polysilicon layer disposed separated from the first electrically conductive contact area providing a second electrically conductive contact area; and
   an insulating glass substrate having a first surface and an opposing second surface, the opposing second surface having a first metal coating disposed on a portion thereon for providing a second electrode of a capacitor, the first metal coating connected via a first conductive feedthrough passageway through said insulating glass substrate to the first surface of said insulating glass substrate and providing a first external electrical contact, wherein a portion of the first metal coating, located on the opposing second surface, providing a third electrically conductive contact area, and wherein a second metal coating is disposed on the opposing second surface of said insulating glass substrate separate from the first metal coating, the second metal coating connected via a second conductive passageway through said insulating glass substrate to tile first surface of said insulating glass substrate and providing a second external electrical contact, wherein a portion of the second metal coating, located on the opposing second surface, providing a fourth electrically conductive contact area, and wherein said insulating glass substrate is bonded to said electrically conductive polysilicon layer and providing a sealed chamber, including the chamber aperture and the isolation trench, both located between the opposing second surface of said insulating glass substrate and second top surface of said electrically insulating oxide layer, and wherein the first electrically conductive contact area of said electrically conductive polysilicon layer and the third electrically conductive contact area of the first metal coating disposed on the opposing second surface of said insulating glass substrate, are electrically connected, and the second electrically conductive contact area of said electrically conductive polysilicon layer and the fourth electrically conductive contact area of the second metal coating disposed on the opposing second surface of said insulating glass substrate, are electrically connected.

17. A capacitive pressure sensor in accordance with claim 16 wherein the first and second conductive passageways comprise a first and second metal coated passageways.

18. A capacitive pressure sensor in accordance with claim 17 further comprising a portion of solder disposed in said first and second metal coated passageways.

19. A capacitive pressure sensor in accordance with claim 16 wherein a reference pressure is stored in said sealed chamber.

20. A capacitive pressure sensor comprising:
   a silicon substrate having a first top surface, wherein said silicon substrate forms a first electrode of a capacitor;
   a silicon dioxide layer disposed on a portion of the first top surface of said silicon substrate and having a second top surface spaced apart from the first top surface of said silicon substrate, said silicon dioxide layer having a lower chamber aperture, a lower isolation trench and a feedthrough aperture disposed therein, wherein the lower chamber aperture, the lower isolation trench and the feedthrough aperture originate on the second top surface of said silicon dioxide layer and conclude on the first top surface of said silicon substrate;
   a electrically conductive polysilicon layer disposed on said silicon dioxide layer, and having a third top surface spaced apart from the second top surface of said silicon dioxide layer, said electrically conductive polysilicon layer extending through the feedthrough aperture of said silicon dioxide layer and conductively contacting said silicon substrate, said electrically conductive polysilicon layer having a chamber aperture disposed therein and originating at the third top surface of said electrically conductive polysilicon layer and terminating at the second top surface of said oxide layer, said electrically conductive polysilicon layer having an isolation trench disposed therein, the isolation trench originating at the third top surface of said electrically conductive polysilicon layer and terminating at the second top surface of said silicon dioxide layer and defining a boundary for a first electrically conductive contact area on the third top surface of said electrically conductive polysilicon layer, a portion of said electrically conductive polysilicon layer disposed separated from the first electrically conductive contact area providing a second electrically conductive contact area; and an essentially planar insulating glass substrate having a first surface with first and second orifices, said essentially planar insulating glass substrate having an opposing second surface with third and fourth orifices, the first and third orifices connected via a first passageway, the first passageway having a first inner surface with a first metal layer disposed on the first inner surface at the first orifice and continuing along the first inner surface and extending to the third orifice on the opposing second surface, said essentially planar insulating glass substrate having a second metal layer electrically connected to the first metal layer, at the third orifice and continuing on the opposing second surface to a first predetermined area, the second metal layer of the first predetermined area forms a second electrode of the capacitor, said second metal layer including a third electrically conductive contact area adjacent to the third orifice, and the second and fourth orifices connected via a second passageway, the second passageway having a second inner surface with a third metal layer disposed on the second inner surface and extending to the fourth orifice on the opposing second surface, said essentially planar insulating glass substrate having a fourth metal layer electrically connected to the third metal layer at the fourth orifice and continuing on the opposing second surface to a second predetermined area on the opposing second surface, the fourth metal layer at the second predetermined area providing a fourth electrically conductive contact area, and wherein said electrically conductive polysilicon layer is anodically bonded to the opposing second surface of said essentially planar insulating glass substrate and forms a sealed chamber including the chamber aperture of the electrically conductive polysilicon layer, the lower chamber aperture of the silicon dioxide layer the lower isolation trench, and the isolation trench, all located between the opposing second surface of said insulating glass substrate and the first top surface of said silicon substrate in which a reference pressure is stored, and wherein the first electrically conductive contact area on the third top surface of said electrically conductive polysilicon layer contacting the third electrically conductive contact area on the opposing second surface of said essentially planar insulating glass substrate that is electrically connected to the first metal layer and providing an electrical contact to the second electrode of said capacitor at the first orifice of the first surface of the essentially planar insulating glass substrate, and wherein the second electrically conductive contact area on the third top surface of said electrically conductive polysilicon layer contacting the fourth electrically conductive contact area on the opposing second surface of said essentially planar insulating glass substrate that is electrically connected to the third metal layer and providing an electrical contact to the second electrode of the capacitor at the second orifice of the first surface of the essentially planar insulating glass substrate.

21. A capacitive pressure sensor in accordance with claim 20 wherein the first metal layer disposed on the inner surface of the first passageway of said essentially planar glass substrate comprises successive layers of chromium, nickel vanadium, and gold.

22. A capacitive pressure sensor in accordance with claim 20 further comprising a portion of solder disposed in said first and second metal coated passageways.

23. A method for fabricating a capacitive pressure sensor comprising the steps of:
 providing a conductive substrate forming a first electrode of a capacitor;
 disposing an electrically insulating layer on said conductive substrate;
 opening a feedthrough aperture area through the electrically insulating layer to the conductive substrate;
 disposing an electrically conductive layer on the electrically insulating layer and through the feed through aperture;
 opening a chamber aperture and an isolation trench through said electrically conductive layer to said electrically insulating layer and forming a first capacitive element substrate;
 providing an insulating substrate having an first surface and an opposing second surface;
 opening a first passageway in the insulating substrate between the first surface and the opposing second surface;
 opening a second passageway in the insulating substrate between the first surface and the opposing second surface;
 disposing metal layers on the first surface, the opposing second surface and in the first and second passageways;
 removing excess said metal layers on the first surface and the opposing second surface of the insulating substrate and providing a second metal layer on the opposing second surface of said insulating substrate adjacent to the first passageway forming a second electrode of the capacitor and providing a third electrically conductive contact area connected to the second metal layer and removing excess said metal layers on the first surface and the opposing second surface of the insulating substrate and providing a fourth electrically conductive contact area on the opposing second surface of said insulating substrate adjacent to the second passageway thus forming a second capacitive element substrate;
 disposing said second capacitive element substrate onto said first capacitive element substrate;
 applying a predetermined pressure to said first capacitive element substrate and said second capacitive element substrate; and then
 bonding said first capacitive element substrate and said second capacitive element substrate and forming a sealed interface there between with a sealed pressure chamber provided between the first capacitive element substrate and second capacitive element substrate.

24. A method for fabricating a capacitive pressure sensor in accordance with claim 23 wherein said step of bonding said first capacitive element substrate and second capacitive element substrate comprises anodically bonding of said first capacitive element substrate and second capacitive element substrate.

25. A method for fabricating a capacitive pressure sensor in accordance with claim 23 wherein the step of disposing an electrically insulating layer on said conductive substrate comprises the step of high pressure deposition of an electrically insulating layer on said conductive substrate.

26. A method for fabricating a capacitive pressure sensor in accordance with claim 23 wherein the step of disposing a metal layer on the first surface, the opposing second surface, and in the first and second passageways comprises the steps of:

disposing a chromium layer on the first surface, the opposing second surface, and in the first and second passageways;

disposing a nickel vanadium layer on the first surface, and in the first and second passageways; and disposing a gold layer on the first surface, the opposing second surface, and in the first and second passageways.

27. A method for fabricating a capacitive pressure sensor in accordance with claim 23 wherein the step of applying a predetermined pressure comprises applying at least a partial vacuum.

* * * * *